United States Patent [19]

Furneaux

[11] Patent Number: 5,624,019
[45] Date of Patent: Apr. 29, 1997

[54] METHOD AND APPARATUS FOR VALIDATING MONEY

[75] Inventor: David M. Furneaux, Maidenhead, United Kingdom

[73] Assignee: Mars Incorporated, McLean, Va.

[21] Appl. No.: 512,842

[22] Filed: Aug. 9, 1995

Related U.S. Application Data

[62] Division of Ser. No. 133,142, Nov. 5, 1993, abandoned.

[30] Foreign Application Priority Data

Apr. 18, 1991 [GB] United Kingdom ............... 9108355

[51] Int. Cl.$^6$ ........................................ G07D 5/08
[52] U.S. Cl. ........................... 194/217; 194/317; 324/227
[58] Field of Search ........................ 194/206, 217, 194/317, 318, 319, 334, 335; 324/227, 236; 453/3

[56] References Cited

U.S. PATENT DOCUMENTS

| | | | |
|---|---|---|---|
| 4,546,869 | 10/1985 | Dean et al. | 194/303 |
| 4,556,140 | 12/1985 | Okada | 194/206 |
| 4,742,903 | 5/1988 | Trummer | 194/317 |
| 5,048,662 | 9/1991 | Yamashita et al. | 194/317 |
| 5,167,313 | 12/1992 | Dobbins et al. | |
| 5,191,957 | 3/1993 | Hayes . | |
| 5,213,190 | 5/1993 | Furneaux et al. | 194/317 |
| 5,330,041 | 7/1994 | Dobbins et al. | 194/206 |
| 5,355,989 | 10/1994 | Best | 194/317 |

FOREIGN PATENT DOCUMENTS

| | | |
|---|---|---|
| 0086648A | 8/1983 | European Pat. Off. . |
| 0101276A | 2/1984 | European Pat. Off. . |
| 0367921A | 5/1990 | European Pat. Off. . |
| 0520230 | 12/1992 | European Pat. Off. . |
| 2646025A | 4/1978 | Germany . |

OTHER PUBLICATIONS

F. Barlach, "Payphone Coin Validation Using Pattern Recognition," Pattern Recognition, vol. 23, pp. 379–384 (1990).

*Primary Examiner*—Karen B. Merritt
*Assistant Examiner*—Scott L. Lowe
*Attorney, Agent, or Firm*—Fish & Richardson P.C.

[57] ABSTRACT

Money items are validated by determining whether n measured properties lie within an n-dimensional ellipse associated with a particular money item. The center of the ellipse lies on the statistical mean of the property measurements for that particular item, and each axis is related to the standard deviation for a respective property measurement.

16 Claims, 3 Drawing Sheets

| | | | | | | |
|---|---|---|---|---|---|---|
| $P_1$ { | $M_{A1}$ | $M_{B1}$ | $M_{C1}$ | $M_{D1}$ | $M_{E1}$ | $M_{F1}$ |
| | $D_{A1}$ | $D_{B1}$ | $D_{C1}$ | $D_{D1}$ | $D_{E1}$ | $D_{F1}$ |
| $P_2$ { | $M_{A2}$ | $M_{B2}$ | $M_{C2}$ | $M_{D2}$ | $M_{E2}$ | $M_{F2}$ |
| | $D_{A2}$ | $D_{B2}$ | $D_{C2}$ | $D_{D2}$ | $D_{E2}$ | $D_{F2}$ |
| $P_3$ { | $M_{A3}$ | $M_{B3}$ | $M_{C3}$ | $M_{D3}$ | $M_{E3}$ | $M_{F3}$ |
| | $D_{A3}$ | $D_{B3}$ | $D_{C3}$ | $D_{D3}$ | $D_{E3}$ | $D_{F3}$ |

5,624,019

METHOD AND APPARATUS FOR VALIDATING MONEY

This is a divisional application of U.S. application Ser. No. 08/133,142 filed on Nov. 5, 1993, now abandoned.

FIELD OF THE INVENTION

This invention relates to a method and apparatus for validating items of money, such as coins or banknotes.

BACKGROUND OF THE INVENTION

It is known when validating coins to perform two or more separate tests on the coin, and to determine that the coin is an authentic coin of a specific type or denomination only if all the test results equal or come close to the results expected for a coin of that type. For example, some known validators have inductive coils which generate electromagnetic fields. By determining the influence of a coin on those fields the circuit is capable of deriving different measurements which are predominantly determined by the thickness, the diameter and the material content of the coins. A coin is deemed authentic only if all three measurements indicate a coin of the same type.

This is represented graphically in FIG. 1, in which the three orthogonal axes $P_1$, $P_2$ and $P_3$ represent the three independent measurements. For a coin of type A, the measurement $P_1$ is expected to fall within a range (or window) $W_{A1}$, which lies within the upper and lower limits $U_{A1}$ and $L_{A1}$. Similarly the properties $P_2$ and $P_3$ are expected to lie within the ranges $W_{A2}$ and $W_{A3}$, respectively. If all three measurements lie within the respective windows, the coin is deemed to be an acceptable coin of type A. In these circumstances, the measurements will lie within an acceptance region indicated at $R_A$ in FIG. 1.

In FIG. 1, the acceptance region $R_A$ is three dimensional, but of course it may be two dimensional or may have more than three dimensions depending upon the number of independent measurements made on the coin.

Clearly, a coin validator which is arranged to validate more than one type of coin would have different acceptance regions $R_B$, $R_C$, etc., for different coin types B, C, etc.

In the prior art, each acceptance window is always predetermined before the test is carried out. Some validators have means for adjusting the acceptance windows. The purpose of the adjustment is either to increase the proportion of valid coins which are determined to be acceptable (by increasing the size of the acceptance window) or to reduce the number of non-genuine coins which are erroneously deemed to be valid (by reducing the size of the acceptance window). Adjustment of the window is carried out either manually, or automatically (e.g. as in EP-A-0155126). In any event, the result of the window adjustment is that the upper and lower limits of the acceptance window are predetermined.

However, by reducing the acceptance windows in order to avoid accepting non-genuine coins, it is possible that genuine coins will then be found to be invalid. Conversely, by increasing the acceptance windows to ensure that a maximum number of genuine coins are found to be valid, more non-genuine coins may also be determined to be valid. The consequence is that adjustment of windows may have adverse effects as well as beneficial effects, and may not increase the "acceptance ratio" (i.e. the ratio of the percentage of genuine coins accepted to the percentage of non-genuine coins accepted), or may only increase this ratio by a small amount.

In the field of banknote validation, measurements are also compared with acceptance regions generally of the form shown in FIG. 1. Similar problems thus arise when modifying the acceptance windows to try to avoid accepting non-genuine notes or rejecting genuine notes.

International Patent Application No. PCT/GB90/01588 and Irish Patent Application No. 3708/90 propose a method of validating items of money comprising deriving at least two different measurements of a tested item, determining whether each measurement lies within a respective range associated with a particular money type, and producing a signal indicating that money of that type has been tested if all measurements fall within the respective ranges for that type, wherein the respective range for at least one of the measurements varies in dependence on at least one other measurement.

The reference to "different measurements" is intended to indicate the measurement of different physical characteristics of the tested item, as distinct from merely taking the same measurement at different times to indicate a single physical characteristic or combination of such characteristics. For example, in GB-A-1 405 937, and in several other prior art arrangements, the time taken for a coin to travel between two points is measured. Although this could be regarded as taking two time measurements and determining the difference, the purpose is simply to obtain a single measurement determined by a particular combination of physical characteristics, and therefore this does not represent "different measurements" as this is understood in the present case. Similarly, it is known to take two successive measurements dependent on the position of a coin with respect to a sensor as the coin passes the sensor, and then to take the difference between those two measurements. Again, this difference would represent a single measurement determined by a single combination of physical characteristics (e.g. a variation in the surface contour of the coin).

In many circumstances, using this technique results in an improved acceptance ratio. For example, it may be found empirically that measurements $P_1$ and $P_2$ of valid money items of type A tend to lie within ranges $W_{A1}$ and $W_{A2}$ respectively. However, it may also be found empirically that genuine items having a large value $P_1$ are unlikely also to have a large value $P_2$. Using the techniques mentioned above, the upper limit of range $W_{A2}$ can be made smaller when large values of $P_1$ are detected. This would not significantly affect the number of valid items which are erroneously rejected, but would cause counterfeit items which may have large values of $P_1$ and $P_2$ to be rejected.

SUMMARY OF THE INVENTION

The present invention is directed to a further and advantageous way of implementing such a technique.

According to the present invention, there is provided a method of validating items of money, the method comprising taking n different measurements of an item of money (where n is an integer equal to or greater than 2) to define a point in n-dimensional space defined by axes representing the n respective measurements, determining whether or not the point lies within an n-dimensional ellipse (as herein defined) the axes of which each correspond to a respective property measurement axis associated with a particular item, and using the determination in evaluating whether or not the tested item corresponds to said particular item.

In another aspect, there is provided a method of validating items of money comprising taking n different measurements of an item of money (wherein n is an integer equal to or greater than 2) and determining whether the following expression $$\sum_{i=1}^{n}$$

$(a_i P_i - b_i)^2$, when evaluated is equal to or greater than a predetermined constant:

wherein $P_1 \ldots P_n$ are related to the respective n measurements and $a_1 \ldots a_n$, $b_1 \ldots b_n$ are predetermined coefficients.

In a further aspect, a method of identifying items of money comprises taking n different measurements of an item of money (where n is an integer equal to or greater than 2) to define a point in n-dimensional space that is defined by axes representing the n respective measurements, determining which of the centroids of a plurality of n-dimensional ellipses (as herein defined, wherein each ellipse is associated with a type of item of money) the said point is closest to and using the determination in evaluating which type of item the tested item corresponds.

In this patent application, an "n-dimensional ellipse" is a figure in n-dimensions which comprises an ellipse when n=2; an ellipsoid when n=3; and, when n is greater than 3, comprises a higher dimensional surface defined by an equation corresponding to that of an ellipse in a higher number of dimensions.

The invention provides a particularly convenient and effective way of arranging for rejection of money items which exhibit property measurements which in combination suggest that the item is statistically unlikely to be genuine.

Preferably, the center of the n-dimensional ellipse corresponds to the mean values of the n different measurements for a population of those particular money items, as determined by statistical analysis. These mean values may differ between individual coin testing apparatuses, and if desired, a calibration process can be carried out in order to determine the mean values (or quantities related thereto) for the individual testing apparatuses. Preferably, the size of the n-dimensional ellipse, when measured along each axis corresponding to a respective property measurement, is equal to a predetermined factor multiplied by the standard deviation of the respective property measurement for that particular money item, as determined by statistical analysis. These standard deviations may be assumed to be the same for individual testing apparatuses of the same general type, i.e. individual calibration may not be required to derive the standard deviation value.

The invention also extends to money validating apparatus arranged to operate in accordance with a method of the invention.

BRIEF DESCRIPTION OF THE DRAWINGS

Arrangements embodying the invention will now be described by way of example with reference to the accompanying drawings, in which.

DETAILED DESCRIPTION OF THE DRAWINGS

Figure 2:
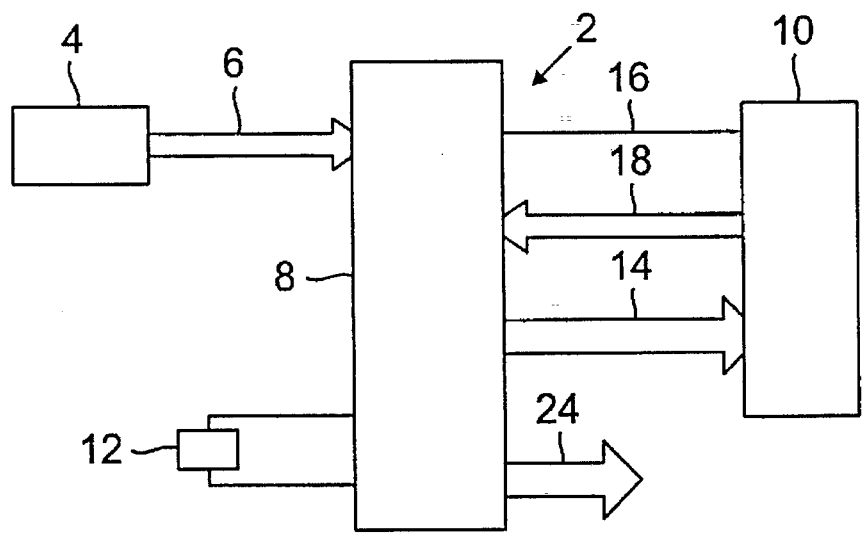
FIG. 2 is a schematic diagram of a coin validator in accordance with the present invention.

The coin testing apparatus 2 shown schematically in FIG. 2 has a set of coin sensors indicated at 4. Each of these is operable to measure a different property of a coin inserted in the apparatus, in a manner which is in itself well known. Each sensor provides a signal indicating the measured value of the respective parameter on one of a set of output lines indicated at 6.

An LSI 8 receives these signals. The LSI 8 contains a read-only memory storing an operating program which controls the way in which the apparatus operates. Instead of an LSI, a standard microprocessor may be used. The LSI is operable to process the measured values received on respective input lines 6 with data values stored in predetermined locations in a PROM 10. The PROM 10 could be any other type of memory circuit, and could be formed of a single or several integrated circuits, or may be combined with the LSI 8 (or microprocessor) into a single integrated circuit.

The LSI 8, which operates in response to timing signals produced by a clock 12, is operable to address the PROM 10 by supplying address signals on an address bus 14. The LSI also provides a "PROM-enable" signal on line 16 to enable the PROM.

In response to the addressing operation, a data value is delivered from the PROM 10 to the LSI 8 via a data bus 18.

By way of example, one embodiment of the invention may comprise three sensors, for respectively measuring the conductivity, thickness and diameter of inserted coins. Each sensor comprises one or more coils in a self-oscillating circuit. In the case of the diameter and thickness sensors, a change in the inductance of each coil caused by the proximity of an inserted coin causes the frequency of the oscillator to alter, whereby a digital representation of the respective property of the coin can be derived. In the case of the conductivity sensor, a change in the Q of the coil caused by the proximity of an inserted coin causes the voltage across the coil to alter, whereby a digital output representative of conductivity of the coin may be derived. Although the structure, positioning and orientation of each coil, and the frequency of the voltage applied thereto, are so arranged that the coil provides an output predominantly dependent upon a particular one of the properties of conductivity, diameter and thickness, it will be appreciated that each measurement will be affected to some extent by other coin properties.

The apparatus so far described corresponds to that disclosed in GB-A-2094008. In that apparatus, on insertion of a coin, the measurements produced by the three sensors 4 are compared with reference values stored in a region of the PROM 10. Each property measurement is compared with the upper and lower limits, representing a window, for each of six coins A to F. If the measured properties all lie within the upper and lower limits of the respective ranges for a particular coin, then the coin is deemed valid and the LSI 8 produces an ACCEPT signal on one of a group of output lines 24, and a further signal on another of the output lines 24 to indicate the denomination of the coin being tested. The validator has an accept gate (not shown) which adopts one of two different states depending upon whether the ACCEPT signal is generated, so that all tested coins deemed genuine are directed along an accept path and all other tested items along another path.

Figure 1:
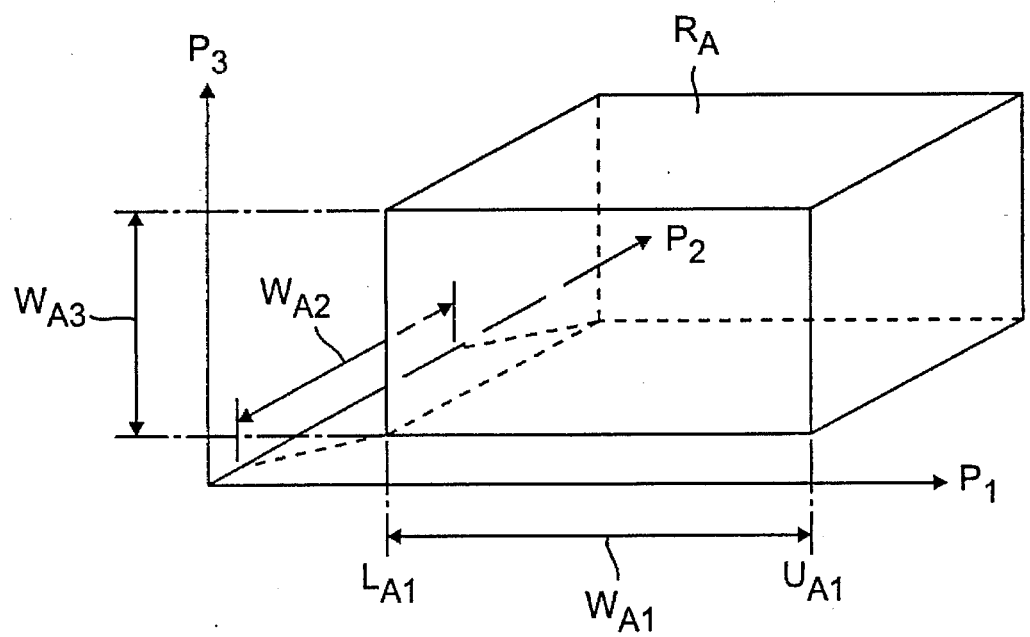
FIG. 1 schematically illustrates an acceptance region in a conventional validator.

The validator of GB-A-2094008 has acceptance regions, defined by the values stored in PROM 10, generally of the form shown in FIG. 1.

Figures 3, 4:
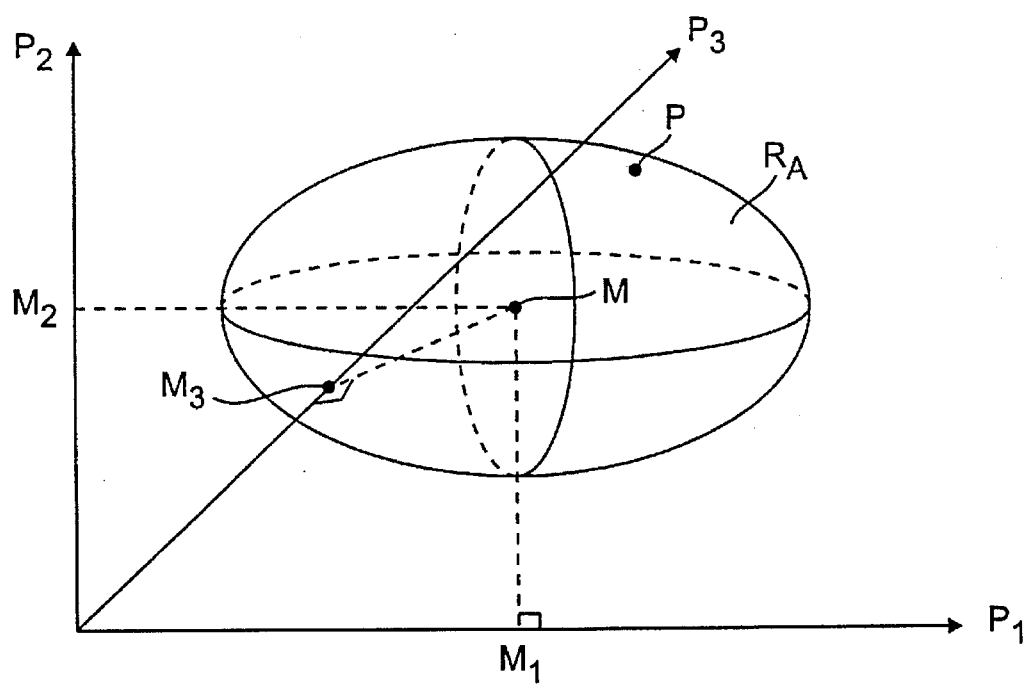
FIG. 3 illustrates by way of example a table stored in a memory of the validator of FIG. 2, the table defining acceptance regions.
FIG. 4 schematically illustrates an acceptance region for the validator of FIG. 2.

In the present embodiment of the invention, however, each of the six acceptance regions has the form shown at $R_A$ in FIG. 4. This differs from the region of FIG. 1 in that it is substantially ellipsoidal in shape. The width of the region $R_A$, when measured along the axis $P_1$, is preferably equal to $s.D_1$, where $D_1$ represents the standard deviation of the measured property $P_1$ of a population of coins from the mean value (which has been empirically determined prior to calibration of the validator), and s represents a predetermined acceptance factor which is calculated in accordance with the desired statistical likelihood of a coin which is accepted by the validator actually being genuine. The factor s is determined in accordance with the desired compromise between accepting non-genuine items and rejecting genuine items. Similarly, the region $R_A$ has widths when measured in the directions of axes $P_2$ and $P_3$ which are equal to $s.D_2$ and $s.D_3$, respectively. (If desired, the factor s may vary for one or more of the axes.)

It will be appreciated that items falling within the region $R_A$ are statistically likely to be acceptable coins, whereas items falling outside the acceptance region are statistically unlikely to be genuine. (Such items would include those which have more than one property measurement close to the individual limits for the respective properties.)

The mid-point M of the region $R_A$ in FIG. 4 is the statistical mean of the coin population measurements for each of the properties $P_1$, $P_2$ and $P_3$.

One possible way of operating the validator in order to achieve an acceptance region $R_A$ as shown in FIG. 4 will be explained below.

With reference to FIG. 3, the PROM 10 stores, for each of coin denominations A to F, a value (e.g. $M_{A1}$) representing the statistical mean of the measurements of property $P_1$ of a population of coins of denomination A, and a value (e.g. $D_{A1}$) representing the standard deviation for those property measurements, and corresponding values for the other properties $P_2$ and $P_3$.

In order to validate an inserted item, the LSI takes all three of the measurements $P_1$, $P_2$ and $P_3$ of the inserted item. The LSI then addresses the PROM 10 so as to read out therefrom the stored values relating to coin A, in order for the LSI to be able to perform the following calculation:

$$Dist = \left(\frac{P_1 - M_1}{D_1}\right)^2 + \left(\frac{P_2 - M_2}{D_2}\right)^2 + \left(\frac{P_3 - M_3}{D_3}\right)^2 \quad (1)$$

The value Dist corresponds to the length of a vector from the mid-point M of the acceptance region to the point representing the measured properties $P_1$, $P_2$ and $P_3$. The LSI then tests to determine whether Dist$\geq$K, where K is a predetermined value. If so, then the measured properties lie outside the acceptance region $R_A$, and the item is deemed to be non-genuine. Otherwise, the test for the property measurements $P_1$, $P_2$ and $P_3$ have been passed. The item is thus deemed to be genuine of denomination A. If the test fails for denomination A, it is performed for denomination B, and so on, until the item either is identified as genuine of some denomination or rejected.

The above calculation assumes s to be the same for all properties. If s differs, the test can be modified to:

$$\left(\frac{P_1 - M_1}{s_1 \cdot D_1}\right)^2 + \left(\frac{P_2 - M_2}{s_2 \cdot D_2}\right)^2 + \left(\frac{P_3 - M_3}{s_3 \cdot D_3}\right)^2 \geq K' \quad (2)$$

(where K' is a predetermined constant) and the PROM 10 can store the products $s_1 \cdot D_{A1}, s_2 \cdot D_{A2}, \ldots$ etc. instead of the deviations $D_{A1}, D_{A2}, \ldots$ etc.

Figure 5:
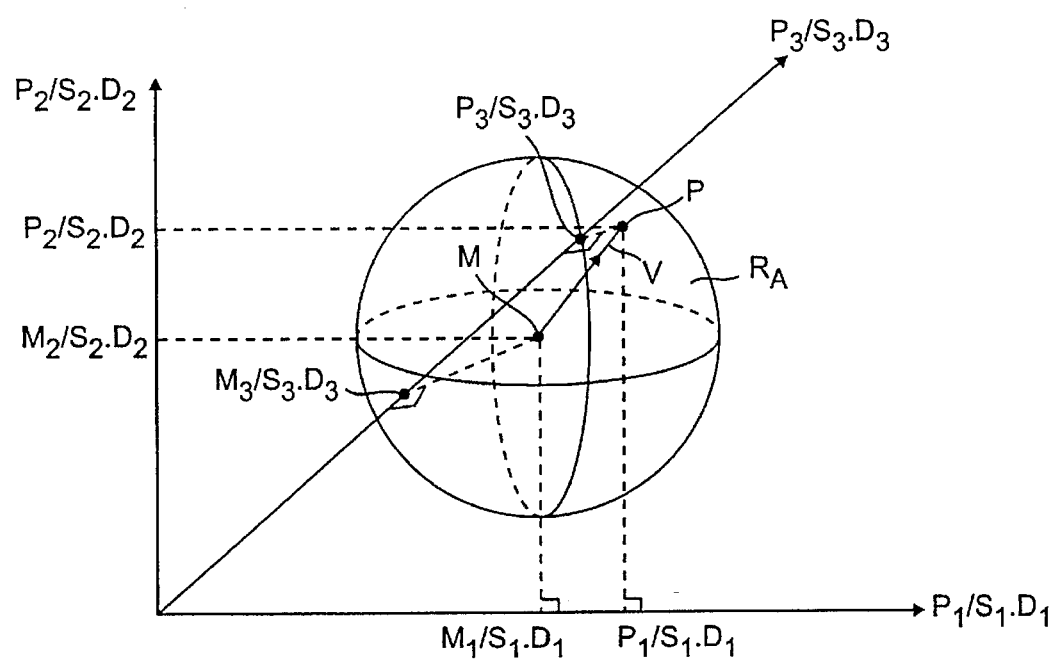
FIG. 5 schematically illustrates the FIG. 4 acceptance region using different axes.

The value Dist effectively represents a single distance value signifying how close all the property measurements are to the statistical mean (centroid). This can be seen more clearly by referring to FIG. 5, which replots the acceptance region $R_A$ of FIG. 4 on to axes which represent the ratios of the properties $P_1$, $P_2$ and $P_3$ to the products of the respective acceptance factors and standard deviations $s_1 \cdot D_1$, $s_2 \cdot D_2$ and $s_3 \cdot D_3$, and thus have corresponding scales. It will be seen that the acceptance region $R_A$ becomes spherical. The value Dist represents the length of the vector V from the mid-point M to the point P representing the measured properties. To reduce the amount of calculation needed, the value Dist is actually equal to the square of this distance, but this does not matter so long as the constant K is chosen appropriately.

Once the evaluation has been carried out in respect of coin A, the same process is carried out in respect of the other coins B to F, which would have respective acceptance regions at different locations and probably of different sizes.

If desired, the calculation could be modified. In general, the following formula could be evaluated to determine whether a coin is acceptable:

$$\sum_{i=1}^{n} (a_i P_i - b_i)^2 \geq K'' \quad (3)$$

wherein K" is a predetermined constant, and $a_n$, $b_n$ are coefficients for each of the n properties of a particular coin denomination, which can be derived using statistical techniques on a population of coins of that denomination. These coefficients could be individually calculated and separately stored, or as in equations (1) and (2) other coefficients related thereto could be stored.

Although it is preferred that this technique be used to test for all the denominations of the coin set with which the validator is to be used, the technique could instead be applied just to the testing of one or more of the coin denominations. It may also be used only in respect of some of the measured properties, further properties being used to evaluate acceptance in a conventional manner.

Although the technique has been described in respect of acceptance regions, whereby a coin is deemed to be valid if its properties lie within the region, the technique is also applicable to rejection regions, i.e. regions within which the properties of specific types of non-genuine items are expected to lie. Thus, if the measured properties are found to lie within such a rejection region, the item is deemed to be non-genuine and rejected.

It is possible to have overlapping regions each associated with a respective different item, in which case the region within which the measured properties are deemed to lie is that associated with the closest mid-point to the measured properties.

As an alternative procedure, irrespective of whether or not there are overlapping regions, the LSI 8 may perform a pre-classifying step whereby it determines which mid-point is closest to the measurement point, thus nominally identifying the tested item, and then determine whether or not the measurement point lies within the ellipse surrounding the mid-point, thus determining acceptability.

The measurements of the properties, as represented in FIG. 4, could be values proportional to physical quantities, but they need not be. They could for example be values representing changes in a physical parameter, such as the frequency of an oscillator, caused when an item moves to a testing position.

Although the above description refers to determining whether particular expressions, when evaluated, are equal to or greater than a predetermined value (thus indicating that the tested item does not correspond to a particular coin denomination), of course this is entirely equivalent to determining whether the expression is equal to or less than a (slightly smaller) predetermined value (thus indicating that the item does correspond to a particular denomination).

References herein to coins are intended to encompass also tokens and other coin-like items.

Although the preceding description relates to the field of coin validation, it will be understood that the techniques are similarly applicable to banknote validation.

I claim:

1. A method of identifying items of money, the method comprising taking n different measurements of an item of money, where n is an integer equal to or greater than 2, to define a point in n-dimensional space defined by axes representing the n respective measurements, determining which one of a plurality of centroids, each one of which is associated with a respective one of a plurality of n-dimensional ellipses each associated with a type of item of money, the said point is closest to and using the determination in evaluating to which type of item the tested item corresponds.

2. A method of identifying a test item of money as corresponding to a first item type, the method comprising:

taking n different measurements of the test item, wherein n is an integer equal to or greater than 2, to define a measurement point in n-dimensional space defined by axes representing the n respective measurements;

providing, for the first item type and at least a second item type, stored mid-point values representing respectively the mid-point, for each said measurement, of a population of the respective item type and stored width values representing the width, along each measurement axis, of the population of the respective item type;

calculating a first distance value representing the distance from the mid-point of the population of the first item type to the measurement point using the first stored mid-point values and the first stored width values;

calculating a second distance value representing the distance from the mid-point of the population of the second item type to the measurement point using the second stored mid-point values and the second stored width values; and determining whether the test item corresponds to the first item type based on the relationship between the first and second distance values.

3. The method of claim 2, in which the determining step comprises determining to which of the first and second mid-points the test point is closer.

4. The method of claim 2, in which the stored first and second mid-point values and the stored first and second width values comprise, respectively, for each item type and for each measurement, the mean and standard deviation of the corresponding item type population.

5. The method of claim 2, in which each said step of calculating a distance value includes, for each measurement, a step of calculating the numerical difference between the measurement and the mid-point for that measurement axis, scaled in proportion to the standard deviation along that measurement axis.

6. The method of claim 2, in which at least one of said item types is a specific type of non-genuine item of money.

7. The method of claim 2, in which the first item type population overlaps with the second.

8. The method of claim 2, comprising generating a signal identifying the test item as corresponding to the first or second item type.

9. The method of claim 2, in which the first and second item population regions represent different genuine money denominations, and a determination is made as to which of the first and second denominations the test item corresponds in dependence upon the relationship between the first and second distance values.

10. The method of claim 2, in which the stored width value along each said measurement axis is equal to the standard deviation of the population along that axis multiplied by a predetermined factor.

11. The method of claim 10, in which the predetermined factor is the same for each said measurement in each item type.

12. The method of claim 2, in which the first item type is a genuine item of money, and the second item type is a non-genuine item, and in which the test item is either accepted as a genuine item of money of the first type or rejected as a non-genuine item depending on the relationship between said first and second distance values.

13. The method of claim 12, in which the two item type populations overlap.

14. The method of claim 2, further comprising:

testing whether or not at least one of the first and second distance values exceeds a predetermined threshold corresponding to an ellipsoidal boundary of the respective item type population.

15. The method of claim 14, in which the testing is performed before the determining step.

16. The method of claim 14, in which the testing step is performed after the determining step.

* * * * *